United States Patent
Kumar et al.

(10) Patent No.: US 8,832,126 B2
(45) Date of Patent: Sep. 9, 2014

(54) CUSTODIAN SUGGESTION FOR EFFICIENT LEGAL E-DISCOVERY

(75) Inventors: Shailesh Kumar, Hyderabad (IN); Mahesh Chhaparia, Hyderabad (IN); Gaurav Agarwal, Balrampur (IN)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/220,013

(22) Filed: Aug. 29, 2011

(65) Prior Publication Data
US 2012/0310951 A1    Dec. 6, 2012

(30) Foreign Application Priority Data
May 30, 2011    (IN) ............................ 1830/CHE/2011

(51) Int. Cl.
*G06F 7/00*    (2006.01)
*G06Q 50/18*    (2012.01)
*G06Q 10/10*    (2012.01)
*G06F 17/30*    (2006.01)

(52) U.S. Cl.
CPC ................ *G06Q 10/10* (2013.01); *G06Q 50/18* (2013.01); *G06F 17/30011* (2013.01)
USPC ........... 707/758; 707/709; 707/722; 707/749; 705/311

(58) Field of Classification Search
None
See application file for complete search history.

(56) References Cited

U.S. PATENT DOCUMENTS

| | | | |
|---|---|---|---|
| 6,738,760 B1* | 5/2004 | Krachman | 1/1 |
| 7,730,113 B1* | 6/2010 | Payette et al. | 707/821 |
| 8,112,406 B2* | 2/2012 | Paknad et al. | 707/706 |
| 8,112,453 B2* | 2/2012 | Falkenberg | 707/803 |
| 8,185,526 B2* | 5/2012 | Wen et al. | 707/730 |
| 8,626,737 B1* | 1/2014 | Panse | 707/708 |
| 2009/0043819 A1* | 2/2009 | Searl et al. | 707/104.1 |
| 2009/0150168 A1* | 6/2009 | Schmidt | 705/1 |
| 2010/0250455 A1* | 9/2010 | Richards et al. | 705/311 |
| 2011/0320494 A1* | 12/2011 | Fisher et al. | 707/780 |
| 2012/0173506 A1* | 7/2012 | Wilansky et al. | 707/709 |
| 2012/0246130 A1* | 9/2012 | Schmidt | 707/694 |

* cited by examiner

*Primary Examiner* — Robert Beausoliel, Jr.
*Assistant Examiner* — Susan F Rayyan
(74) *Attorney, Agent, or Firm* — Sterne, Kessler, Goldstein & Fox P.L.L.C.

(57) ABSTRACT

Given a set of documents relevant to a litigation hold and a seed set of custodians, a second set of custodians can be generated and suggested to a user. After receiving a seed set of keywords and/or custodians, documents are identified based on their relevance. Relevant documents are searched for custodian names, and appropriate custodian names are presented to a user. Additionally, based on a first set of custodians, a suggested set of custodians can be provided to a user based on relationships between the sets of custodians.

28 Claims, 7 Drawing Sheets

CUSTODIAN SUGGESTION FOR EFFICIENT LEGAL E-DISCOVERY

CROSS-REFERENCE TO RELATED APPLICATIONS

This application claims priority to Indian Provisional Application No. 1830/CHE/2011, filed May 30, 2011, which is incorporated by reference herein in its entirety.

BACKGROUND

1. Field

Embodiments relate to electronic discovery of documents subject to a litigation hold, and particularly to efficiently identifying a set of documents relevant to a litigation.

2. Related Art

During or in anticipation of a litigation, parties to a litigation may be required to preserve and eventually produce documents in their possession that relate to the litigation. Documents to be preserved are known as being subject to a litigation hold. Documents may exist in electronic form in computer systems or electronic storage devices. One element of electronic discovery (e-discovery) involves obtaining a thorough set of relevant documents from those computer systems and electronic storage devices. When there are a large number of documents contained in one or more computer systems, the e-discovery process can be very cumbersome. Compliance with a litigation hold requires a thorough search of the computer systems and electronic storage devices. However, at least for reasons of privacy and confidentiality, parties want to avoid producing documents that are not relevant to the litigation. Therefore, a final determination of a document's relevance to the litigation is usually made by a manual review process. The expense of this process is related to the number of documents reviewed.

To reduce the expense of e-discovery, computer software may be used to automatically search for and retrieve relevant documents. Typically, the software will search for emails or documents containing selected keywords or names of individuals related to the litigation. The names and keywords used in the search are identified by the parties or people associated with the case. However, the results of such searches may include many documents that are not relevant to the litigation or may exclude many documents that are relevant to the litigation.

BRIEF SUMMARY

Embodiments relate to systems and methods for suggesting custodians to be used to identify documents for a litigation hold. In an embodiment, a seed set of keywords is received. A set of documents corresponding to the seed set of keywords is identified by a processing device. Based on the documents returned, a custodian associated with one or more of the documents is identified and provided to a user or client.

In another embodiment, a first set of custodians subject to a litigation hold is received. A set of documents relevant to the litigation hold and related to one or more of the custodians in the first set is identified. Based on the set of documents, a suggested set of custodians is identified. The custodians in the second set are not included in the first set of custodians. The suggested set of custodians is then provided to a user or client.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments relate to systems and methods for performing electronic discovery of documents subject to a litigation hold, and particularly to efficiently identifying a set of relevant documents. A document may be any type of electronic file, including but not limited to an email, text message, distribution list, spreadsheet, text file, bit map, or graphics file. One of ordinary skill would recognize that other types of electronic files may also be electronic documents according to embodiments. Electronic documents, as referred to herein, may be accessible by known electronic communications methods and may be stored in a variety of storage media, including but not limited to electronic media, such as Random Access Memory (RAM) or Read Only Memory (ROM), magnetic media, such as tape drives, floppy disks or hard disk drives (HDD), and optical media, such as Compact Disks (CD) or Digital Video Disks (DVD).

To define the parameters and criteria of a litigation hold, a legal team may consider the facts of the case and the parties involved in the events leading up to the case. Based on the locations of these documents, a target corpus of documents to search may be identified. In some cases, it may be necessary to search through a large number of documents in a large storage area to find a few documents containing relevant information. The storage area to be searched may be identified by physical storage devices, logical storage partitions, document security designations, or by any other means known to one of ordinary skill in the art. A large search scope increases the potential for finding relevant documents but may require a prohibitively large search time and expense. The entire corpus of documents may be searched for documents that are relevant to the litigation, and a manual review of every document in the corpus could be a long and laborious process. Effectively filtering or culling the corpus may reduce the quantity of documents that need to be reviewed. Documents not meeting the search criteria may not be reviewed. In embodiments, the corpus of documents may be contained within a single computer or storage device, or the corpus of documents may be spread across multiple servers, client computers, storage devices and other components that may or may not be interconnected. For example, the corpus of documents may be stored in a hosted user environment utilizing distributed storage.

Figure 1:
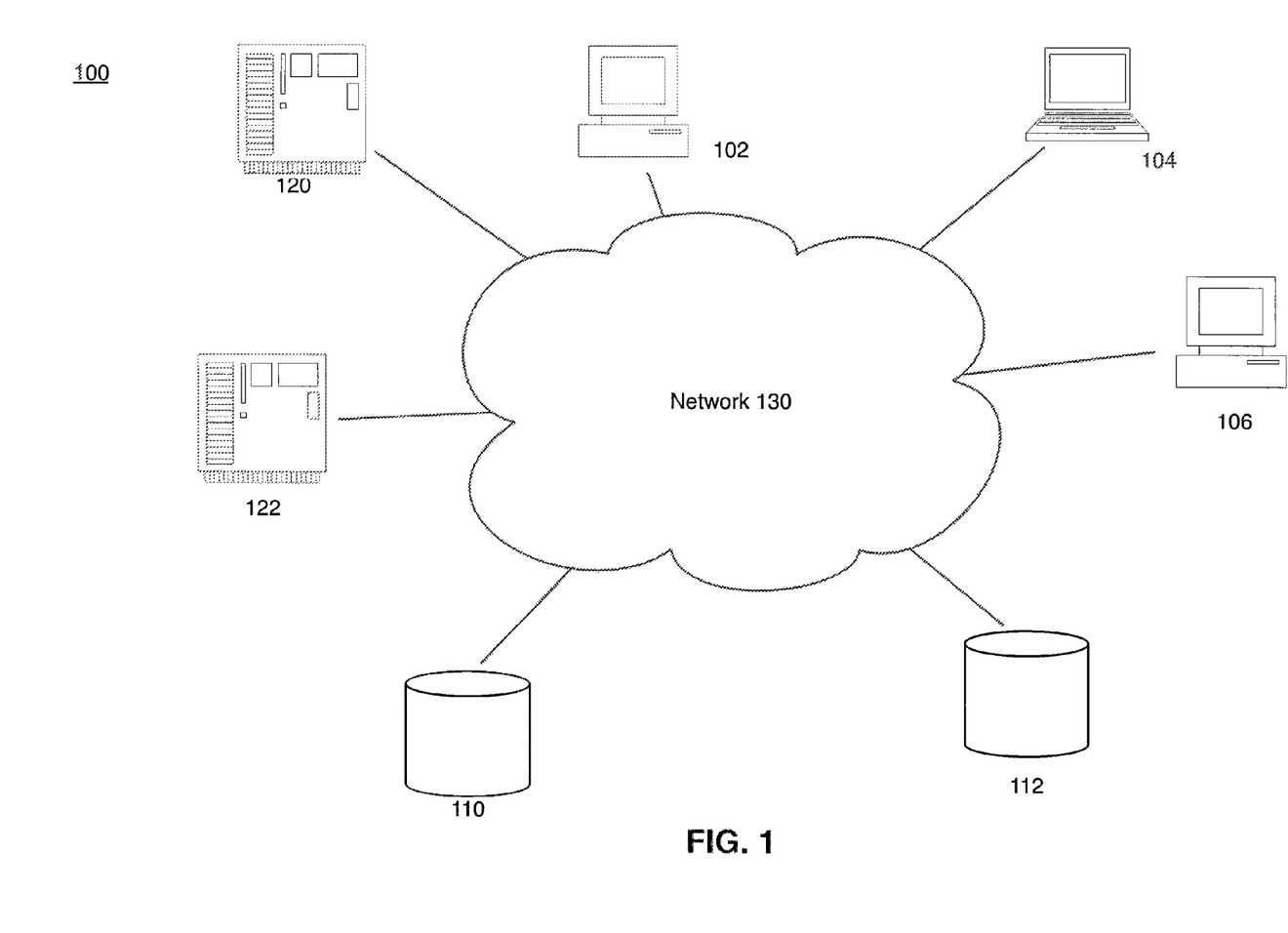
FIG. 1 is a diagram of an exemplary system that may be used in embodiments described herein.

FIG. 1 is a diagram of a system 100 in which a corpus of documents may be contained, according to an embodiment. Although system 100 is described herein with respect to a limited number of devices and a single network, one of ordinary skill in the art will recognize that a system containing relevant documents may include different numbers of components and other types of components than those shown. In addition, the system components may be stand-alone or may be interconnected by one or more networks of various types.

System 100 of FIG. 1 is provided as a non-limiting example for explanation purposes. System 100 includes processing devices, such as servers 120 and 122, and client computers 102, 104 and 106. System 100 also includes storage devices 110 and 112. The devices in system 100 are interconnected by network 130. Network 130 may be a local area network (LAN), wide area network (WAN), intranet, interne, WI-FI, cell phone network, or any other wired or wireless network for communication between computing devices. One of ordinary skill in the art would recognize that there are many possible variations on the number and interconnection of computing and storage devices in which all or part of the corpus of documents could be contained and searched according to embodiments.

Utilizing one or more computing devices, the corpus of documents may be searched for potentially relevant documents. In system 100, a search may be initiated, for example, at client computer 102. The corpus of documents may be isolated to documents stored within client computer 102. Additionally, or alternatively, the corpus may include documents contained within, e.g., storage device 110 and/or server 120. When a search is performed, information about each document or set of documents in the corpus of documents may be obtained. This information is compared to a set of search criteria that has been prepared in response to the litigation hold. The search criteria may include several types of information used to identify potentially relevant documents. For example, the names and locations of documents satisfying the search criteria may be returned in the search results. The actual documents may also be returned, or links may be provided to individual documents. Other sets of search results are possible.

Each potentially relevant document may be ranked according to how well it meets the search criteria. This ranking data may be performed by the search software and returned with the set of documents. Ranking data may be used to return a limited number of "top ranked" documents that best match the search criteria based on the ranking information. For example, if search criteria includes a particular keyword, documents may be ranked according to how many times each document contains the particular keyword.

Depending on the criteria provided for the search, the set of documents returned from a search may range from being empty to being very large. The quality of the search may be determined by how many relevant documents are identified in the returned set of documents, and may also consider how many non-relevant documents are identified. A higher quality search identifies more relevant documents and fewer non-relevant documents in the set of documents.

In order to determine the quality of a search, documents identified in the search may be retrieved and reviewed to determine whether they are relevant to the litigation hold. The review may be done by one or more members of the legal team associated with the litigation or by other means. Once a document is reviewed, the document may be labeled with an indication of relevance. The label may provide a binary indicator, indicating that a document is either relevant or non-relevant. Alternatively, the label may indicate a degree of relevance to the litigation hold, such as a percentage.

Once all the documents, or a defined subset of documents, in the set of returned documents have been labeled with a relevance indicator, the quality of the search can be determined. Unless it can be shown that all the relevant documents have already been retrieved, the initial search criteria, the quality of the results, and the returned set of documents may be reviewed. New search criteria may then be generated and a new search may be performed. Several iterations of search and review may be required to develop criteria that will result in a high quality search.

As described herein, a training set of documents may be utilized to help generate keywords and queries. A training set of documents may be a subset of a large set of documents subject to a litigation hold. For example, if 100,000 documents exist in a set under litigation hold, a set of 1,000 may be used as a training set. The training set of documents may be determined by a systematic workflow that samples documents based on multiple criteria, such as the top documents relevant to a particular query, the top documents representative of a cluster, a random sample of documents across all documents or within a cluster, or any other set of documents. The training set may be reviewed by a member of a legal team to determine which of the training set documents are relevant to the case and which are not. After reviewing the training set of documents, embodiments described herein may use the data of the training set to suggest keywords and queries to return documents in the larger set that reflect the characteristics of the documents previously reviewed. These documents may also be reviewed or labeled in the same way as the training documents.

The training set of documents may constantly evolve, and suggestions may improve based on the documents in the training set. For example, embodiments may start with a training set of 100 documents with labels indicating whether individual documents are relevant or not. Each subsequent iteration may add another 100 documents to the labeled set. These additional documents may be added to the training set to improve keyword or query suggestions.

In conjunction with labeled documents, a set of predicted labeled documents may also be used to suggest keywords and queries. These documents may be generated in part by building a classifier. A classifier may be built using the currently labeled set of documents. For example, 500 out of 100,000 documents may be currently labeled. The relevance score over the remaining unlabeled set of documents (in this example, 99,500 documents) may be predicted using the classifier. The relevance score may range, for example, between −1 and 1. In this example, score of −1 indicates that the document is predicted to be highly irrelevant, while a score of 1 indicates that the document is predicted to be highly relevant. The absolute value of the prediction score may indicate how confident the model is in making the prediction. For example, if the score is close to 0 (i.e. 0.1 or −0.075) the classifier is deemed not confident as to whether to label the particular document as relevant or non-relevant. If the score is close to 1 (i.e. 0.85 or −0.93), the classifier has a high confidence in its prediction of relevant and non-relevant documents. Of the unlabeled documents, those documents having a high confidence score may be labeled to be either relevant or not. The confidence score may be compared against a threshold to determine whether the document should be labeled. For example, out of 99,500 unlabeled documents, 25,000 documents may have a confidence score above a threshold (for example, 0.6). Those 25,000 documents may be assigned a predicted label based on the sign of the score (positive for relevant, negative for non-relevant). The total pool of 500 labeled documents and 25,000 predicted labeled documents may be used to suggest keywords and queries.

Search Criteria

Search criteria may include several types of information about the relevant documents. For example, the litigation hold may target documents that were created, modified, or transmitted during one or more specific time periods. In this example, if the time and date information obtained for a particular document does not fall within a specified period, the document would not satisfy the search criteria and would not be included in the results. For a variety of reasons, specified time periods may be modified in subsequent searches. A document falling within the specified time period(s) may be subject to further analysis as described herein.

Another common element of search criteria is the identification of document owners or custodians. For example, emails and other electronic documents belonging to individuals that are involved in the events leading up to the litigation may be relevant to the litigation hold and may be identified as potentially relevant to the search. As new information is obtained about the individuals involved in the related events, a new list of custodians can be generated for an update to the search criteria.

Other search criteria may be used as well. For example, the name or textual content of a document may be compared to a list of keywords that are related to the subject matter of the case. If a keyword is found in the title or contents of the document, the document may be identified as potentially relevant to the litigation. Keywords used as search criteria may not be limited to single words. A keyword may be a string of characters or may include operators, such as wildcard characters that are used in searching character strings, as known to persons of ordinary skill in the relevant art(s). A keyword may also be known as a search term, and may include two or more words. In this way, keywords can be used to find, for example, words, pairs of words, strings of words, phrases, or expressions. Some keywords may be more significant than others in a given search. While some keywords may be only an indication of possible relevance, other keywords may, by themselves, positively identify a document as relevant or non-relevant without the need for further review.

Search criteria may be further defined by using complex queries, such as those used in character string manipulation. Conjunctive and disjunctive boolean operators (AND and OR) may be used together to generate queries having complex expressions of keywords. Similarly, the NOT operator can be used to generate queries that provide greater specificity, as will be explained below.

The above-described search elements may be combined together to develop a complete set of search criteria that is used to search the identified corpus of documents for potentially relevant documents. The search may be performed by one or more processing devices.

Figure 2:
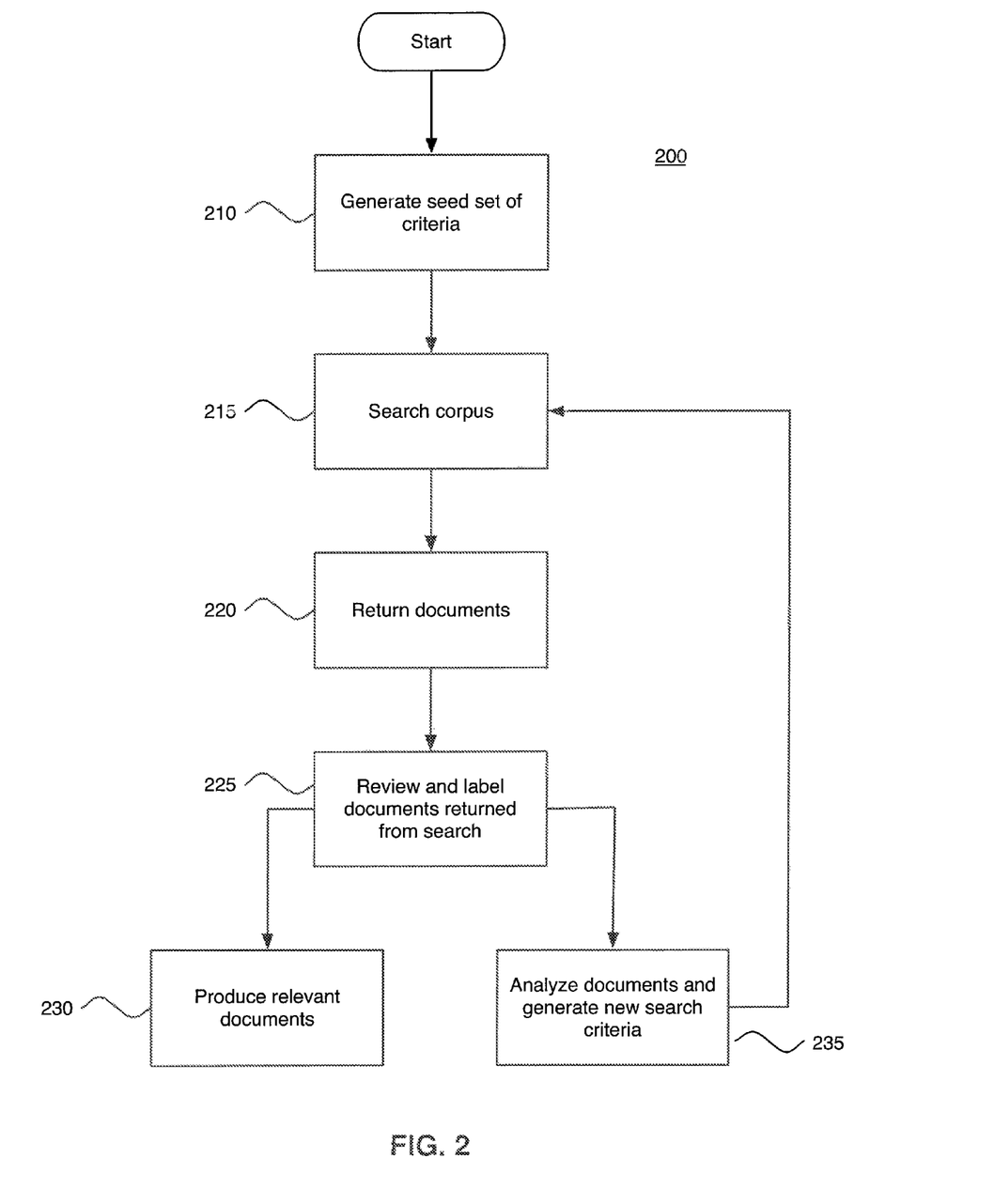
FIG. 2 is a flow diagram of a method for searching for potentially relevant documents, according to an embodiment.

FIG. 2 is a flow diagram of an exemplary method 200 detailing the process described above, according to an embodiment. At block 210, information pertaining to the litigation is examined and an initial set (seed set) of criteria is generated. The seed set may be based on, for example, educated guesses by those knowledgeable in the particular litigation. Initial criteria may include, for example and without limitation, identification of a corpus of documents to search, target time periods, a seed set of custodians, and a seed set of keywords. At block 215, the corpus of documents is searched using the search criteria. At block 220, a set of potentially relevant documents is returned.

At block 225, the documents are reviewed. During this process, the set of potentially relevant documents is reviewed for relevance to the litigation hold, and reviewed documents are labeled with an indication of relevance. Documents that are labeled as relevant at block 225 may be produced, at block 230, for use in the litigation. Also, at block 225, some relevant documents may be removed from the production due to confidentiality, privilege, and other considerations.

Following block 225, the search criteria, the resulting set of documents, and the documents' respective indications of relevance may be analyzed to determine the quality of the search at block 235. If another search is desired, a new set of search criteria may be generated at block 235. Using the new search criteria, the process returns to block 215, at which a subsequent search is performed and a new set of potentially relevant documents is returned. The process then proceeds to block 220, as described above and iterates through blocks 215, 220, 225 and 235 in an effort to improve the quality of the search results.

Improving the quality of the search in a subsequent iteration requires a thorough analysis of the potentially relevant documents and the indications of relevance from a prior search. A challenge for a legal team is to perform the analysis and generate improved search criteria in as little time as possible. Many reviewers may be needed to manually review all the potentially relevant documents in a reasonable amount of time. This process is frequently expensive and time consuming.

According to an embodiment, new search criteria for a search in a litigation hold can be quickly generated by an automated method. A first set of documents may be returned from an initial search based on a seed set of queries. In an embodiment, a process and system are provided for generating additional custodians to be used in the search criteria. One or more processing devices may be used to generate custodians based on the results of an initial search. Various analytical techniques may be employed to determine the significance of custodians associated with the documents.

Generating Suggested Sets of Custodians

According to an embodiment, new search criteria for a search in a litigation hold can be quickly generated by an automated method. A first set of documents may be returned from an initial search based on a seed set of custodians. In an embodiment, a process and system are provided for expanding the list of custodians used in the search criteria. One or more processing devices may be used to read the names and contents of the documents returned from the first search. Using linguistic analysis on the data that is read, proper names can be identified. The seed set of custodians may typically contain the names of parties known to be involved in the events leading up to a litigation. However, the documents obtained from those custodians may contain the names of other persons or business with whom they have associated. Those other persons may be lesser known or heretofore unknown parties that were also involved in those events. Various analytical techniques may be employed to determine the significance of a particular name found in the documents. Significance may be attributed to the names of senders or recipients of email communication, the frequency of occurrence of a name in a set of documents, or a relationship between names and other search criteria.

As described above, an initial search for documents may include a seed set of custodian names. The seed set of custodian names may be developed from facts in a litigation. However, an initial custodian list may not be available, or may be incomplete. For example, a legal team may have no knowledge or incomplete knowledge of the individuals involved in events related to the litigation.

Figure 3:
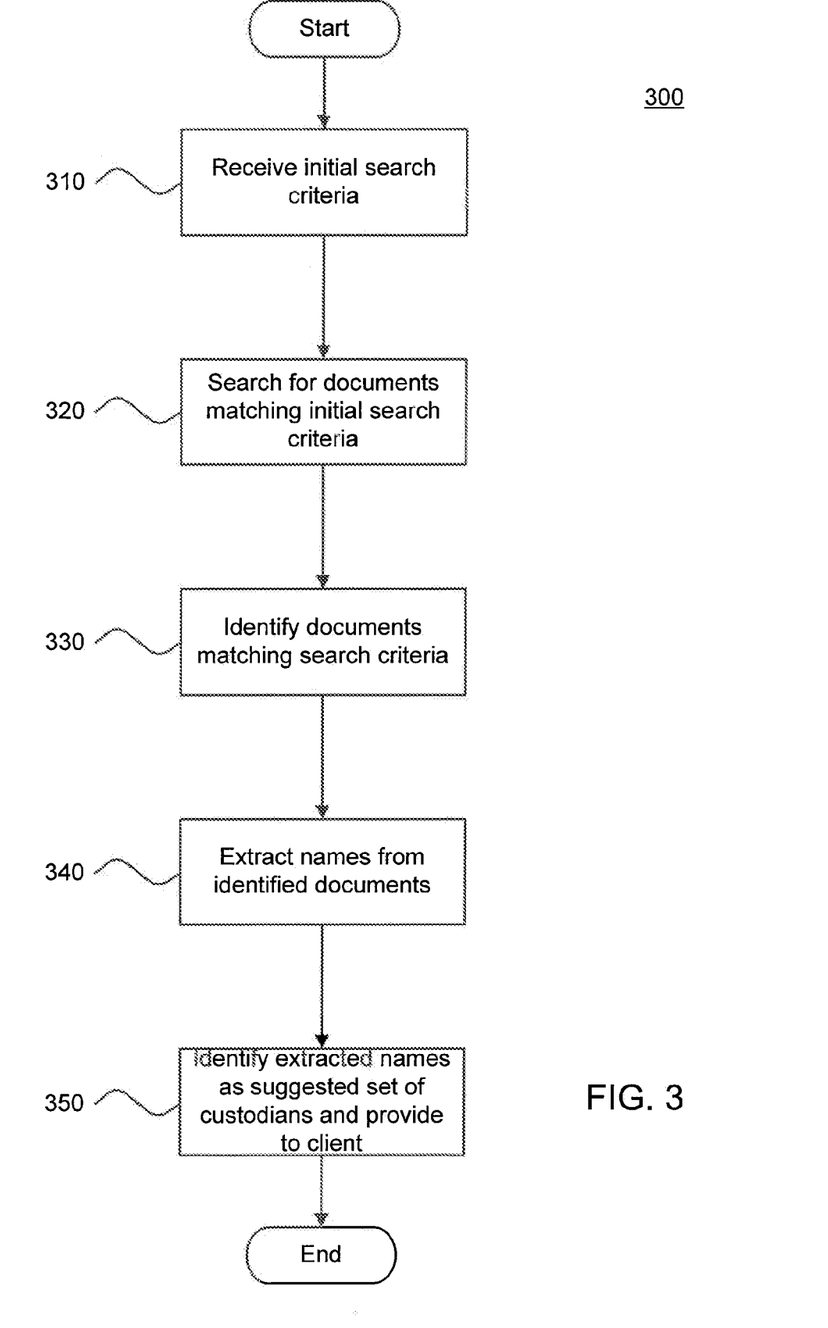
FIG. 3 is a flow diagram of a method for generating an initial "seed" set of custodians in accordance with an embodiment.

FIG. 3 is a flow diagram of a method 300 for generating an initial "seed" set of custodians that are suggested to a client for use in a subsequent search, according to an embodiment. In an embodiment, a set of keywords may be developed based on the facts of a case as a seed set of search keywords. A corpus of documents may be identified as including every electronic document used by a party. Alternatively, since it may be difficult to search through every known electronic storage area used by a party, a smaller corpus of documents may be identified as the target of the initial search. The search scope can also be limited to a target time window, as described above.

At block 310, initial search criteria is received. Search criteria may include, for example, a seed set of keywords, as well as a particular time period in which desired documents may be found.

At block 320, the corpus of documents is searched for all documents matching the initial search criteria. Documents may be identified by searching a specific corpus of documents on a particular device, such as a computer, storage device, or in a hosted user environment. More complex searches may be applied in step 320, based on other initial search criteria such as complex queries, which are described in more detail below.

At block 330, a set of documents as a result of the search at block 320 is identified. In step 340, names are extracted from each document in the set of documents. The extracted names may be, for example, the sender or recipient of a electronic mail (e-mail) message. Extracted names may also be names found in the name of the document, or in certain metadata fields of the document, such as the creator or owner of an electronic document. An extracted name may also be, for example, the last person to edit a document.

At block 350, the names extracted from the set of documents may be identified as a suggested set of custodians and provided to a client. In an embodiment, all names extracted from the set of documents may be provided to the client. In another embodiment, the extracted names may be sorted according to frequency, and the most frequently occurring name or names may be provided to the client. The client may be, for example, a user or a client process. The suggested set of custodians may then be used in a subsequent search.

Once a set of custodians of interest in the litigation has been identified, documents of those custodians can be more closely reviewed. The identities of other parties related to the case may also be identified, and the custodian set or list expanded to include them. Other parties may have been the source or destination of some communication, such as e-mail. The other related parties may also be identified in communications or named in documents, such as contracts, invoices, wills, organizational charts, or any other type of document from one or more known custodians. In an embodiment, a suggested set of custodians contains every name found in the set of documents. In a further embodiment, the names of previously known custodians may be omitted. The suggested set of custodians may also contain names of parties with specific relationships to the known custodian. For example, if a particular executive is a known custodian, her assistant may be identified as an additional custodian in the suggested set of custodians. The types of relationships identified from a custodian's documents will depend on the nature of the litigation and may be identified with simple or complex queries. Custodians with many types of relationships can be identified in this way and embodiments are not limited to a particular type of relationship or query.

Figure 4:
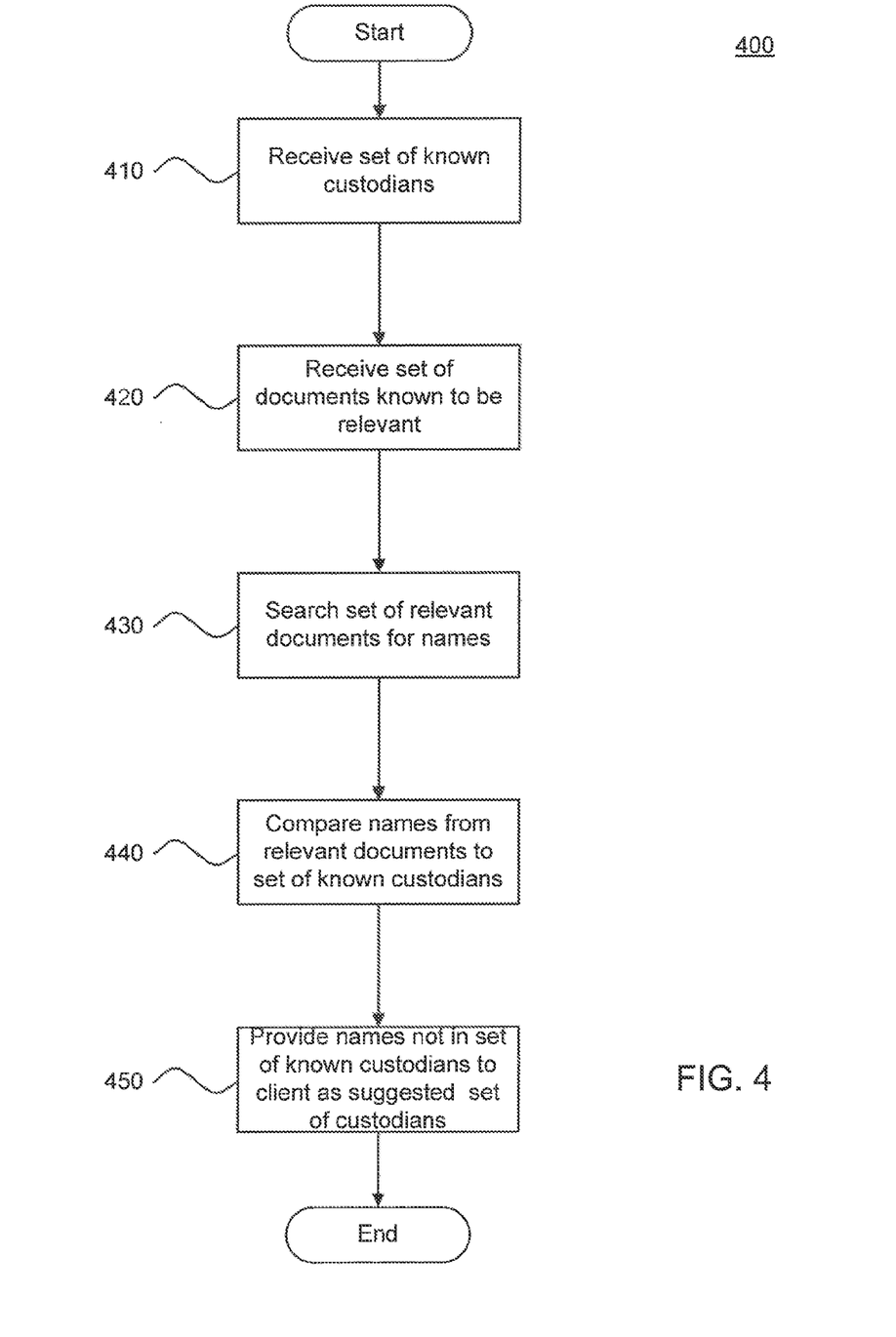
FIG. 4 is flow diagram of a method for providing a suggested set of custodians in accordance with an embodiment.

FIG. 4 is flow diagram of a method 400 for providing a suggested set of custodians to a client, according to an embodiment. At block 410, a set of known custodians subject to a litigation hold is identified and received. The set of known custodians may be generated by a member of the legal team, for example, or may be the result of an execution of exemplary method 300 described above.

At block 420, a set of documents known to be relevant to the litigation is received. The documents may have been identified as relevant by one or more members of a legal team, or may be known to be relevant in any other manner.

At block 430, the set of documents known to be relevant is searched for potential custodian names. Names may be found in the information about a document, such as metadata. Additionally, names may be found in the content of a document. A variety of search techniques may be used to identify names of potential custodians. For documents of recognized formats, a search may focus on specific fields of the document. For example, names may be identified by the "From:" field of an email. The identification of other parties, as described in the context of method 300, may also be applicable to method 400. At block 440, the set of identified names is compared to the set of known custodians. Names not found in the set of known custodians may be entered into a suggested set of custodians. In block 450, the suggested set of custodians is provided to a client.

The suggested set of custodians generated by methods 300 and 400 may be used in subsequent searches. A suggested set of custodians may require expansion of the corpus of documents in subsequent searches if documents of the suggested set of custodians are not already contained in the present corpus.

Figure 5:
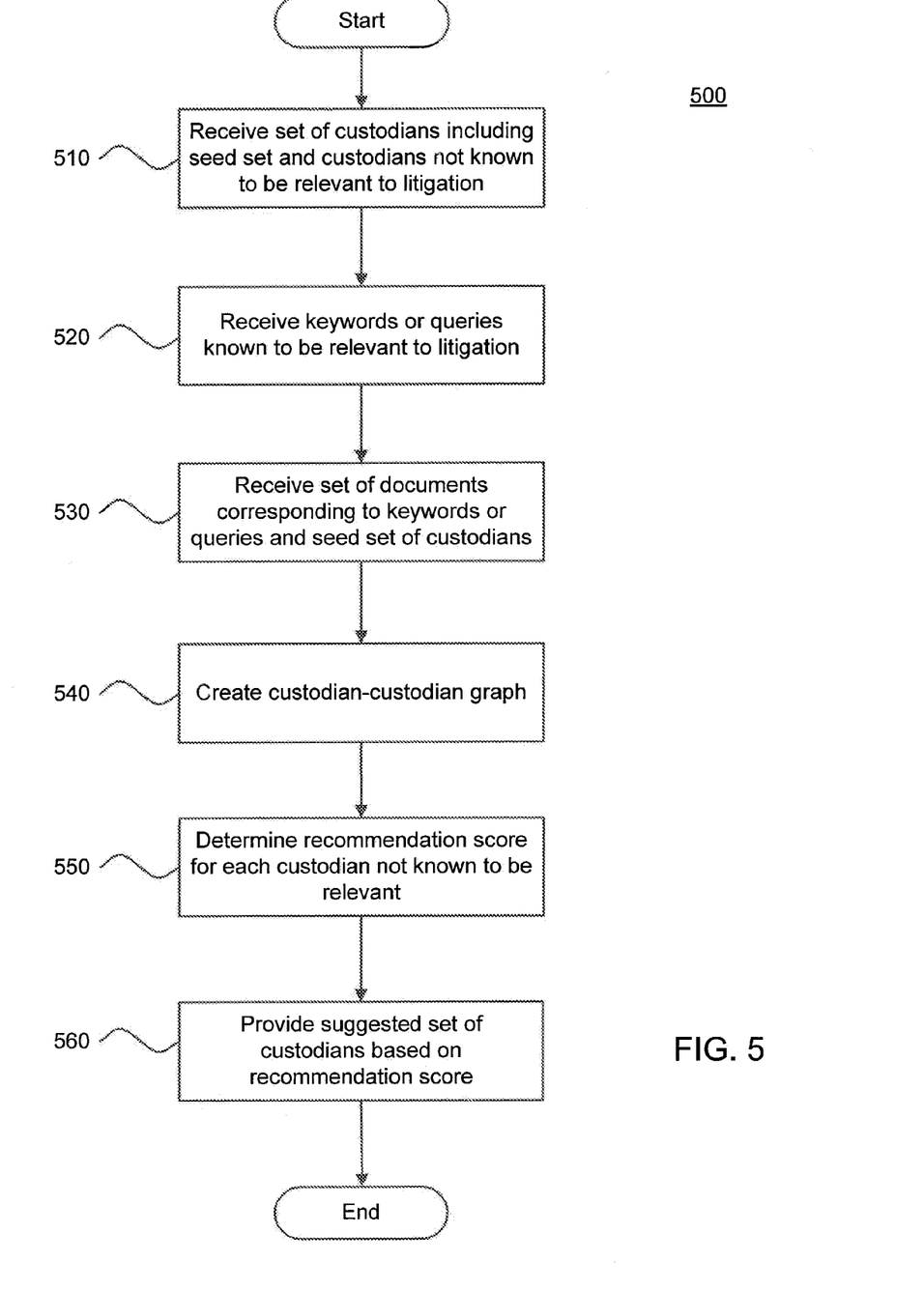
FIG. 5 is a flow diagram of a method for providing a suggested set of custodians to a client, in accordance with an embodiment.

FIG. 5 is a flow diagram of a further method 500 for providing a suggested set of custodians to a client, in accordance with air embodiment. At block 510, a set of custodians is received. The set of custodians may include a seed set that may have been the result of an execution of exemplary method 300, or determined otherwise. Additionally, the set of custodians may include custodians not known to be relevant to the litigation. For example, the set of custodians not known to be relevant to the litigation may include all custodians not in the seed set.

At block 520, keywords or queries known to be relevant to the litigation are received. These keywords or queries may have been previously identified by a member of a legal team, for example.

At block 530, a set of documents corresponding to the keywords or queries received at block 520 is received. These documents are also associated with the seed set of custodians received at block 510.

At block 540, a custodian-custodian graph may be created between custodians received at block 510. For example, a custodian-custodian graph may be created between every pair of custodians in the received set of custodians. Such a custodian-custodian graph may be created on the basis of keywords or relevant documents. The custodian-custodian graph is further explained below.

At block 550, a recommendation score is determined for each custodian not known to be relevant to the litigation. The recommendation score is further explained below.

At block 560, based on the recommendation score, a suggested set of custodians not in the seed set are provided to a client as a suggested set of custodians. The suggested set of custodians may be those with the highest recommendation score.

As described above with respect to block 540 of method 500, a custodian-custodian graph may be created in order to suggest custodians.

A custodian-custodian graph may measure the strength of the relationship between two custodians based on keywords or relevant documents. For a custodian-custodian graph based on keywords, such a graph may determine a weight between two custodians c1 and c2, given a particular keyword k. This weight may be represented by W(c1, c2|k).). This weight may be computed using the number of documents shared between custodians c1 and c2 which contain the keyword k as compared to all the documents shared between custodians c1 and c2. The sum of the weights between two custodians for all keywords may represent the overall relationship between two custodians. Because keywords may not be equally as important as each other, the importance of a keyword, represented by U(k), may be taken into account when determining the overall relationship between two keywords. Thus, the overall relationship between two keywords c1 and c2 may be expressed as:

$$W(c1, c2) = \sum_{k} U(k) * W(c1, c2|k)$$

For a custodian-custodian graph based on relevant documents, such a graph may determine the weight between two custodians based on the number of relevant documents associated with each custodian. Each document d may have an associated relevance score U(d). If a document d is associated with two custodians, the strength of the relationship between the two custodians may increase by the document's relevance score. Thus, for each document d associated with two custodians c1 and c2, the weight W(c1, c2) may be increased by the relevance score U(d), using the following equation: W(c1, c2)=W(c1, c2)+U(d).

As described with respect to block 550 of method 500, a recommendation score may be determined for each custodian not in the seed set of custodians. To determine the recommendation score, the known importance of a given custodian may be used. For example, the known importance X(c) of a seed set custodian may be 1, while the known importance of custodians not in the seed set may be zero. Thus, to suggest custodians not in the seed set ($c_{new}$), a score $R(c_{new})$ may be determined which takes into account the relationship between each $c_{new}$ and custodians in the seed set c, as well as the importance of the custodians in the seed set. Thus, each $R(c_{new})$ may be defined as:

$$R(c_{new}) = \sum_{c} X(c) * W(c_{new}, c)$$

The custodians with the highest score $R(c_{new})$ may be a suggested set of custodians provided to a user.

As above, the suggestion process may be iteratively improved. For example, as new custodians are suggested, additional documents corresponding to the relevant keywords or queries and associated with the new custodians may cause the custodian-custodian relationship graph to change. Additionally, as more documents are labeled relevant or not relevant, the information used to create the custodian-custodian graph will also change. Accordingly, the second step of determining the $R(c_{new})$ score may identify new custodians if using an updated custodian-custodian graph.

Figure 6:
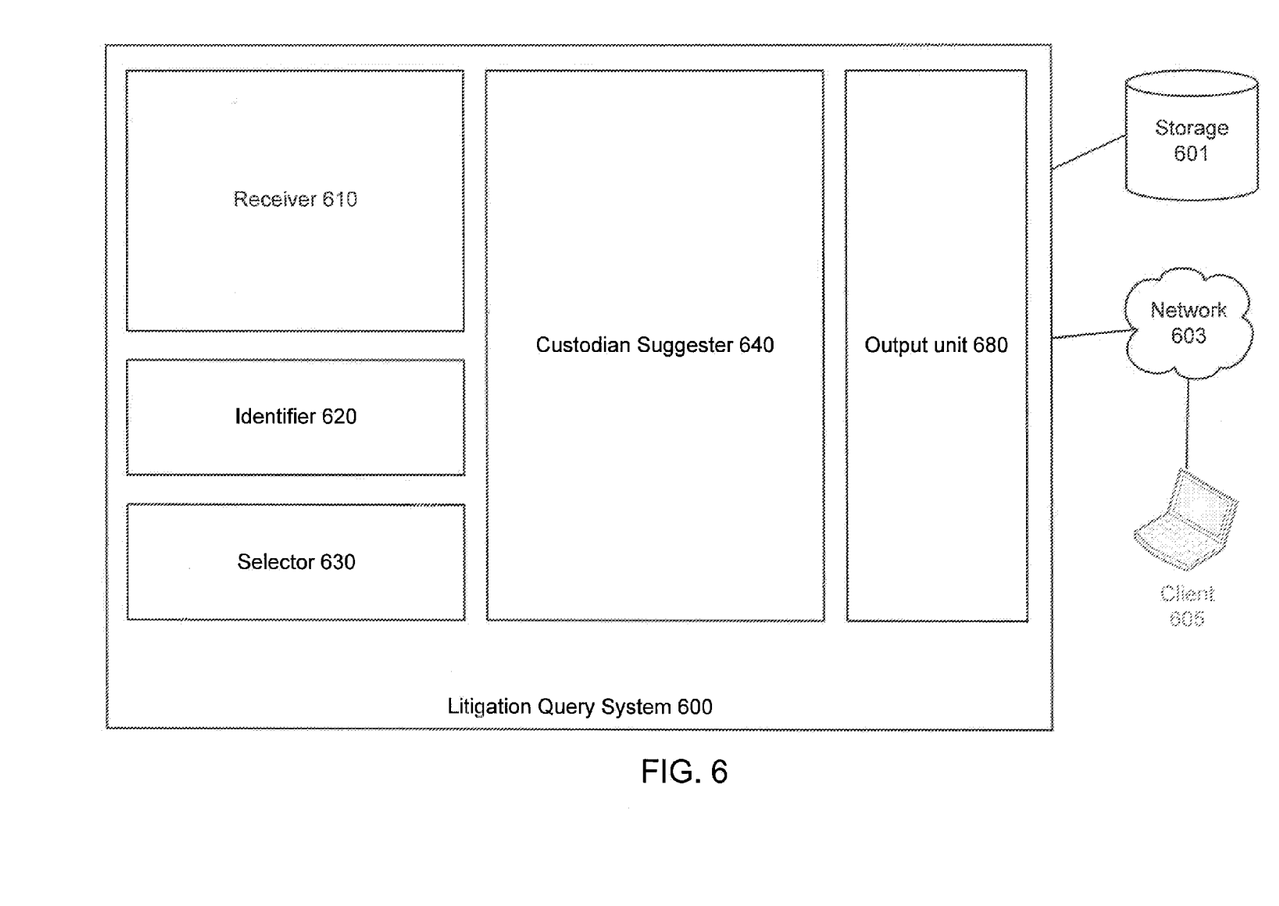
FIG. 6 is a diagram of a system in accordance with an embodiment.

FIG. 6 is a diagram of an exemplary litigation query system 600 that may be used to implement various embodiments disclosed herein.

Litigation query system 600 includes a receiver 610. Receiver 610 may be configured to receive data such as seed custodian lists, keywords, or queries. Additionally, receiver 610 may be configured to receive data such as a training set of documents, as described with respect to various embodiments disclosed herein.

Litigation query system 600 also includes an identifier 620 and selector 630. Identifier 620 may be used in accordance with various embodiments disclosed herein to identify documents corresponding to a query, keywords, or custodians. Selector 630 may be configured in accordance with various embodiments disclosed herein to select documents, a query, a custodian, or a keyword.

Litigation query system 600 may also include custodian suggester 640. Custodian suggester 640 may be configured to operate in accordance with various blocks of methods 300, 400, and 500 to generate a suggested set of custodians to be placed on litigation hold, in accordance with embodiments disclosed herein.

Litigation query system 600 may also include output unit 650. Output unit 650 may be configured to display or otherwise notify a user, client, or other party of the results generated by custodian suggester 640.

In an embodiment, litigation query system 600 is connected to network 603. Network 603 may be a local area network (LAN), wide area network (WAN), intranet, internet, WI-FI, cell phone network, or any other wired or wireless network for communication between computing devices. In an embodiment, litigation query system is connected to client 605 via network 603.

In an embodiment, litigation query system 600 may be connected to storage 601, directly or indirectly via network 603. Storage 601 may contain a training set of documents, a set of documents to be placed on litigation hold, or any other data necessary for the operation of litigation query system 600.

Figure 7:
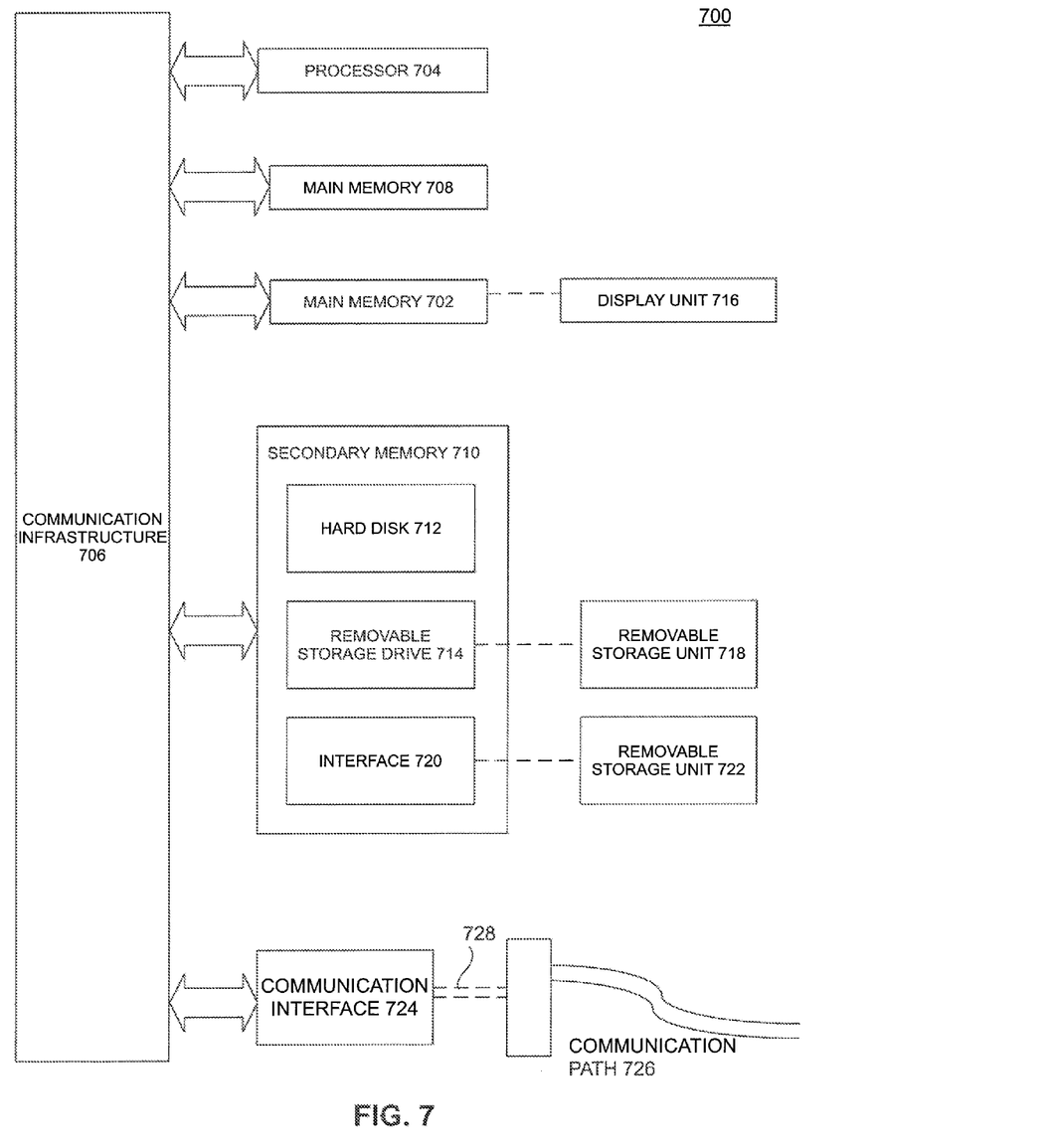
FIG. 7 is a diagram of an exemplary computer system used to implement various embodiments.

Various aspects of embodiments described herein can be implemented by software, firmware, hardware, or a combination thereof. FIG. 7 illustrates an example computer system 700 in which the embodiments, or portions thereof, can be implemented as computer-readable code. Various embodiments are described in terms of this example computer system 700.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, such as random access memory (RAM), and may also include a secondary memory 710. Secondary memory 710 may include, for example, a hard disk drive and/or a removable storage drive. Removable storage drive 714 may include a floppy disk drive, a magnetic tape drive, an optical disk drive, a flash memory, or the like. The removable storage drive 714 reads from and/or writes to removable storage unit 718 in a well-known manner. Removable storage unit 718 may include a floppy disk, magnetic tape, optical disk, etc. which is read by and written to by removable storage drive 714. As will be appreciated by persons skilled in the relevant art(s), removable storage unit 718 includes a computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM, and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program product" and "computer readable medium" are used to generally refer to storage media such as removable storage unit 718, removable storage unit 722, and a hard disk installed in hard disk drive 712. Computer program product and computer readable medium can also refer to one or more memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the embodiments as discussed herein. In particular, the computer programs, when executed, enable processor 704 to implement the processes of embodiments, such as the steps in the methods discussed above. Accordingly, such computer programs represent controllers of the computer system 700. Where embodiments are implemented using software, the software may be stored in a computer program product and loaded into computer system 700 using removable storage drive 714, interface 720, or hard drive 712.

Embodiments may also be directed to computer products having software stored on any computer readable medium. Such software, when executed in one or more data processing devices, causes a data processing device(s) to operate as described herein.

CONCLUSION

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of suggesting custodians subject to a litigation hold, comprising:
   receiving a set of keywords or queries;
   identifying, by one or more processing devices, a set of documents relevant to the set of keywords or queries;
   identifying, by one or more processing devices, one or more custodians associated with one or more documents in the set of documents; and
   determining a set of one or more candidates for the litigation hold from the identified one or more custodians based upon a comparison of the identified one or more custodians to a known set of one or more custodians relevant to the litigation hold, wherein each of the identified one or more custodians that is external to the known set of one or more custodians is added to the set of one or more candidates, providing, by the one or more processing devices, the determined set of one or more candidates for the litigation hold to a user.

2. The method of claim 1, wherein the at least one of the identified one or more custodians is the owner of one or more documents.

3. The method of claim 1, wherein the at least one of the identified one or more custodians is the last to edit one or more documents.

4. The method of claim 1, wherein the at least one of the identified one or more custodians is identified as the sender or a recipient of a document.

5. The method of claim 1, wherein the at least one of the identified one or more custodians is identified in the name of a document.

6. The method of claim 1, wherein the providing comprises:

performing a search for one or more additional documents relevant to the litigation hold based upon the determined set of one or more candidates for the litigation hold; and providing the one or more additional documents as being relevant to the litigation hold, wherein the one or more additional documents are external to the set of documents relevant to the set of keywords or queries.

7. The method of claim 1, wherein the identifying comprises: extracting the determined set of one or more candidates for the litigation hold from the content or metadata of one or more documents of the identified set of documents.

8. A method of suggesting custodians subject to a litigation hold, comprising:

receiving an identification of a first set of custodians subject to a litigation hold;

identifying, by one or more processing devices, a set of documents, each document in the set of documents being relevant to the litigation hold and related to one or more custodians in the first set of custodians;

determining, by the one or more processing devices, a suggested set of custodians based on a custodian graph between the first set of custodians and a suggested set of custodians that indicates a relationship between the first set of custodians and the suggested set of custodians based on the set of documents, wherein each custodian in the suggested set of custodians is associated with one or more documents in the set of documents and wherein each custodian in the suggested set of custodians is external to the first set of custodians; and providing, by the one or more processing devices, the suggested set of custodians to a user for litigation hold candidacy.

9. The method of claim 8, wherein the suggested set of custodians is determined based on the sender or recipient of a document.

10. The method of claim 8, wherein the suggested set of custodians is determined based on the name of one or more documents.

11. The method of claim 8, wherein the suggested set of custodians is determined based on proper names found in one or more documents.

12. The method of claim 8, wherein the custodian graph indicates the relationship based on a keyword shared between at least one of the first set of custodians and at least one of the suggested set of custodians that exists within at least one of the documents.

13. The method of claim 12, wherein the keyword is associated with a weight.

14. The method of claim 8, wherein the relationship is based on a number of documents shared between at least one of the first set of custodians and at least one of the suggested set of custodians.

15. A system for suggesting custodians subject to a litigation hold, comprising:

a processor communicatively coupled to a non-transitory memory;

a receiver to receive a set of keywords or queries;

an identifier to identify a set of documents relevant to the set of keywords or queries;

a custodian suggester implemented on the processor to identify one or more custodians associated with one or more documents in the set of documents, and determine a set of one or more candidates for the litigation hold from the identified one or more custodians based upon a comparison of the identified one or more custodians to a known set of one or more custodians relevant to the litigation hold, wherein each of the identified one or more custodians that is external to the known set of one or more custodians is added to the set of one or more candidates; and an output unit to provide the determined set of one or more candidates for the litigation hold to a user.

16. The system of claim 15, wherein the at least one of the identified one or more custodians is the owner of one or more documents.

17. The system of claim 15, wherein the at least one of the identified one or more custodians is the last to edit one or more documents.

18. The system of claim 15, wherein the at least one of the identified one or more custodians is identified as the sender or a recipient of a document.

19. The system of claim 15, wherein the at least one of the identified one or more custodians is identified in the name of a document.

20. A system for suggesting custodians subject to a litigation hold, comprising:

a processor communicatively coupled to a non-transitory memory;

a receiver to receive an identification of a first set of custodians subject to a litigation hold;

an identifier to identify a set of documents, each document in the set of documents being relevant to the litigation hold and related to one or more custodians in the first set of custodians;

a custodian suggester implemented on the processor to determine, a suggested set of custodians based on a custodian graph between the first set of custodians and a suggested set of custodians that indicates a relationship between the first set of custodians and the suggested set of custodians based on the set of documents, wherein each custodian in the suggested set of custodians is associated with one or more documents in the set of documents and wherein each custodian in the suggested set of custodians is external to the first set of custodians; and an output unit to provide the suggested set of custodians to a user for litigation hold candidacy.

21. The system of claim 20, wherein the suggested set of custodians is determined based on the sender or recipient of a document.

22. The system of claim 20, wherein the suggested set of custodians is determined based on the name of one or more documents.

23. The system of claim 20, wherein the suggested set of custodians is determined based on proper names found in one or more documents.

24. The system of claim 20, wherein the custodian graph indicates the relationship based on a keyword shared between at least one of the first set of custodians and at least one of the suggested set of custodians that exists within at least one of the documents.

25. The system of claim 24, wherein the keyword is associated with a weight.

26. The system of claim 20, wherein the relationship is based on a number of documents shared between at least one of the first set of custodians and at least one of the suggested set of custodians.

27. A non-transitory computer readable medium containing instructions which, when executed by one or more processing devices, perform a method of suggesting custodians subject to a litigation hold, comprising:

receiving a set of keywords or queries;

identifying, by one or more processing devices, one or more custodians associated with one or more documents in the set of documents; and determining a set of one or more candidates for the litigation hold from the identified one or more custodians based upon a comparison of the identified one or more custodians to a known set of one or more custodians relevant to the litigation hold, wherein each of the identified one or more custodians that is external to the known set of one or more custodians is added to the set of one or more candidates, providing, by the one or more processing devices, the determined set of one or more candidates for the litigation hold to a user.

28. A non-transitory computer readable medium containing instructions which, when executed by one or more processing devices, perform a method of suggesting custodians subject to a litigation hold, comprising:

receiving an identification of a first set of custodians subject to a litigation hold;

identifying, by one or more processing devices, a set of documents, each document in the set of documents being relevant to the litigation hold and related to one or more custodians in the first set of custodians;

determining, by the one or more processing devices, a suggested set of custodians based on a custodian graph between the first set of custodians and a suggested set of custodians that indicates a relationship between the first set of custodians and the suggested set of custodians based on the set of documents, wherein each custodian in the suggested set of custodians is associated with one or more documents in the set of documents and wherein each custodian in the suggested set of custodians is external to the first set of custodians; and providing, by the one or more processing devices, the suggested set of custodians to a user for litigation hold candidacy.

* * * * *